United States Patent [19]

Nozawa et al.

[11] Patent Number: 4,519,026
[45] Date of Patent: May 21, 1985

[54] NUMERICAL CONTROL SYSTEM WITH GRAPHICAL DISPLAY PROCESSING OF SIZE AND SHAPE OF PART CONTOUR

[75] Inventors: Ryoichiro Nozawa; Nobuyuki Kiya

[73] Assignee: Fujitsu Fanuc Limited, Minamitsuru, Japan

[21] Appl. No.: 390,378

[22] Filed: Jun. 21, 1982

[30] Foreign Application Priority Data

Jun. 22, 1981 [JP] Japan .................. 56-96375

[51] Int. Cl.³ .......................... G05B 19/42
[52] U.S. Cl. .................. 364/167; 364/131; 364/171; 364/188; 364/189; 318/562
[58] Field of Search ............ 364/131, 132, 133, 134, 364/171, 167, 168, 169, 170, 474, 521, 522, 188, 189, 190; 318/562

[56] References Cited

U.S. PATENT DOCUMENTS

| | | | |
|---|---|---|---|
| 2,875,427 | 2/1959 | Koppel et al. | 318/562 X |
| 3,526,757 | 9/1970 | Rees et al. | 318/562 |
| 3,882,304 | 5/1975 | Walters | 364/132 X |
| 4,010,356 | 3/1977 | Evans et al. | 364/171 X |
| 4,120,583 | 10/1978 | Hyatt | 364/171 X |
| 4,150,427 | 4/1979 | Slawson | 364/474 |
| 4,152,765 | 5/1979 | Weber | 364/474 |
| 4,228,495 | 10/1980 | Bernhard et al. | 364/171 X |
| 4,281,379 | 7/1981 | Austin | 364/132 |
| 4,303,973 | 12/1981 | Williamson, Jr. et al. | 364/189 |
| 4,393,449 | 7/1983 | Takeda et al. | 364/474 |
| 4,435,771 | 3/1984 | Nozawa et al. | 364/474 |

OTHER PUBLICATIONS

Patents Abstracts of Japan, vol. 6, No. 126, (P-127) [1003], Jul. 10, 1982.
European Search Report at The Hague, by Cornillie on 12/4/84.
"Step/7-A Tape Generator for N/C Turning", Fred Ketley, Danly Macine Corporation, 1980, pp. 348-352.
*Tool & Manufacturing Engineers Handbook,* Third Edition, Society of Manufacturing Engineers, 1976, pp. 12-1-12-2; 12-115-12-156 and 12-185-12-186.
*Numerical Control,* R. M. Dyke, 1967, pp. 119-157.
"News Horizons for Manufacturing", *Proceedings of Numerical Control Society,* Mar. 25-28, 1974, Los Angeles, California, pp. 56-71.

*Primary Examiner*—Jerry Smith
*Assistant Examiner*—Allen MacDonald
*Attorney, Agent, or Firm*—Staas & Halsey

[57] ABSTRACT

A numerical control system which includes an automatic programmer and at least one numerical control device interconnected by a cable, in which a numerical control program prepared by the automatic programmer is transferred to the numerical control device. The automatic programmer includes an input unit for entering data, a processor which edits the data for producing a numerical control program, a memory for storing the complicated numerical control program, and a display device which displays a graphic in accordance with the output of the processor. The numerical control device includes a memory for storing the numerical control program, which is transferred from the automatic programmer via the cable.

9 Claims, 16 Drawing Figures

Fig. 3
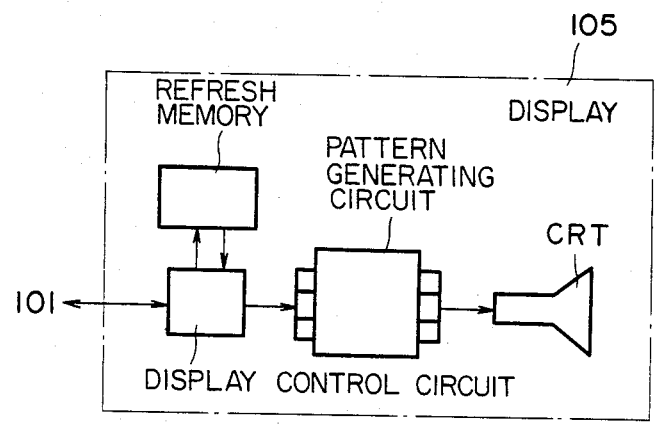
Fig. 4a    Fig. 4b    Fig. 4c    Fig. 4d
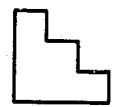 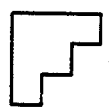 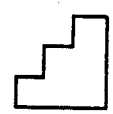 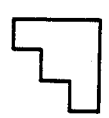

(a)

| | | |
|---|---|---|
| $P_1$ | 0 | 0 |
| $P_2$ | $+K$ | 0 |
| $P_3$ | $+K$ | $-K'$ |
| $P_4$ | $+2K$ | $-K'$ |
| $P_5$ | $+2K$ | $-2K'$ |
| $P_6$ | $+3K$ | $-2K'$ |
| $P_7$ | $+3K$ | $-3K'$ |
| $P_8$ | 0 | $-3K'$ |

(b)

| | | |
|---|---|---|
| $P_1$ | $X_1$ | $Z_1$ |
| $P_2$ | $X_1+K$ | $Z_1$ |
| $P_3$ | $X_1+K$ | $Z_1-K'$ |
| $P_4$ | $X_1+2K$ | $Z_1-K'$ |
| $P_5$ | $X_1+2K$ | $Z_1-2K'$ |
| $P_6$ | $X_1+3K$ | $Z_1-2K'$ |
| $P_7$ | $X_1+3K$ | $Z_1-3K'$ |
| $P_8$ | $X_1$ | $Z_1-3K'$ |

(c)

| | |
|---|---|
| $X_1$ | $Z_1$ |
| $X_2$ | $Z_2$ |
| $X_3$ | $Z_3$ |
| $X_4$ | $Z_4$ |
| $X_5$ | $Z_5$ |
| $X_6$ | $Z_6$ |
| $X_7$ | $Z_7$ |
| $X_8$ | $Z_8$ |

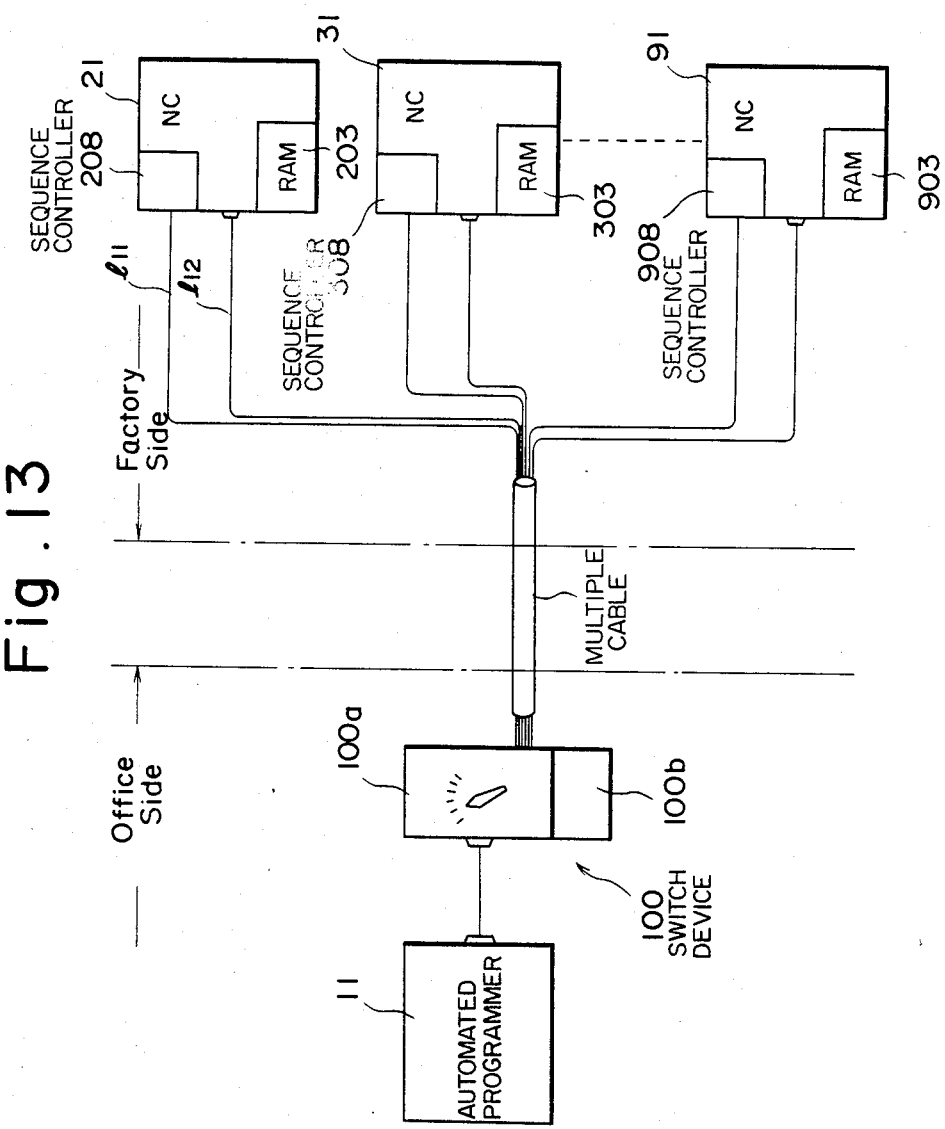

NUMERICAL CONTROL SYSTEM WITH GRAPHICAL DISPLAY PROCESSING OF SIZE AND SHAPE OF PART CONTOUR

BACKGROUND OF THE INVENTION

This invention relates to a numerical control system and, more particularly, to a numerical control system in which a single automatic programmer is connected to a plurality of numerical control devices.

Numerical control devices include so-called manual numerical control devices which are comparatively simple in construction and do not rely upon a tape reader for reading in data. In one configuration of a manual numerical control (or NC) device, data such as positioning or cutting data is preset on a number of dials provided on the panel of the NC device which, subsequently, reads the data from the dials in sequential fashion to execute the prescribed numerical control processing. Alternatively, the numerical data may be entered successively and stored in a memory from an MDI (manual data input unit), after which the NC device sequentially reads the numerical data out of the memory to perform the desired numerical control processing. Thus, with a manual NC, (1) direct programming is performed at the job site while the technician/programmer observes the work drawing or blueprint, (2) the program data is entered by means of the dials or MDI, and (3) the manual NC causes the machine tool to perform an actual machining operation on the basis of the program data.

The early manual NC devices of the above type did not lend themselves to easy programming, machining efficiency was poor because of the considerable time required for programming, and input errors were quite common. Improved manual NC devices have appeared which make it possible to carry out programming directly from blueprints, in a shorter period of time, and with fewer errors. Nevertheless, even these devices do not enable programming to be performed rapidly, despite the improvement over the earlier devices in terms of the programming time requirement. In addition, with the manual NC devices proposed heretofore, control of the machine tool cannot be performed while programming is in progress. This is a serious disadvantage since the prolonged machine tool idle time results in reduced efficiency. In an effort to solve these problems, a manual NC device has been developed which incorporates separate hardware (such as a microprocessor exclusively for preparing the machining program, and hardware (again, such as a microprocessor) exclusively for controlling the machine tool. These separate items of hardware operate independently of each other, with the arrangement being such that the completed machining program is transferred from the storage area on the programming side to the storage area on the machine control side whenever necessary. It is therefore possible to realize rapid programming and to control the machine tool even while programming is in progress. This recently developed manual NC device thus functions as both an automatic programmer and numerical control device and is advantageous as it greatly shortens programming time and enhances efficiency by permitting numerical control to be carried out while a program is being prepared. A problem encountered with this latter manual NC device is one of total cost, since additional expenses are entailed by providing each of the NC devices at a factory with the automatic programming function. Furthermore, while the above manual NC device does have the advantage of enabling programming during the control of a machine tool, such programming must be carried out at the location of the NC device, namely at the job site, where the noisy environment can be a disturbing factor.

SUMMARY OF THE INVENTION

The present invention discloses a numerical control system wherein a single automatic programmer is connected to a plurality of numerical control devices to enable a numerical control program to be transmitted from the automatic programmer to any desired numerical control device.

An object of the present invention is to provide a numerical control system in which each of a plurality of numerical control devices need not be provided with an automatic programming function.

Another object of the present invention is to provide a numerical control system in which programming can be carried out at a location other than the site of a numerical control device.

Still another object of the present invention is to provide a numerical control system which enables a program to be prepared easily and in a short period of time.

Yet another object of the present invention is to provide a numerical control system which enables programming and numerical control processing to be carried out concurrently.

A further object of the present invention is to provide a numerical control system which does not require a paper tape reader, puncher or paper tape for preparing and reading in a numerical control program.

Other features and advantages of the invention will be apparent from the following description taken in connection with the accompanying drawings, in which like reference characters designate the same or similar parts throughout the figures thereof.

BRIEF DESCRIPTION OF THE DRAWINGS

FIG. 3 is a block diagram of the graphic display 105 device in FIG. 2,

FIGS. 4a—4d and 5 are various contour patterns useful in describing a programming operation;

FIGS. 12 and 13 are block diagrams of different embodiments of a numerical control system according to the present invention.

DESCRIPTION OF THE PREFERRED EMBODIMENTS

Figure 1:
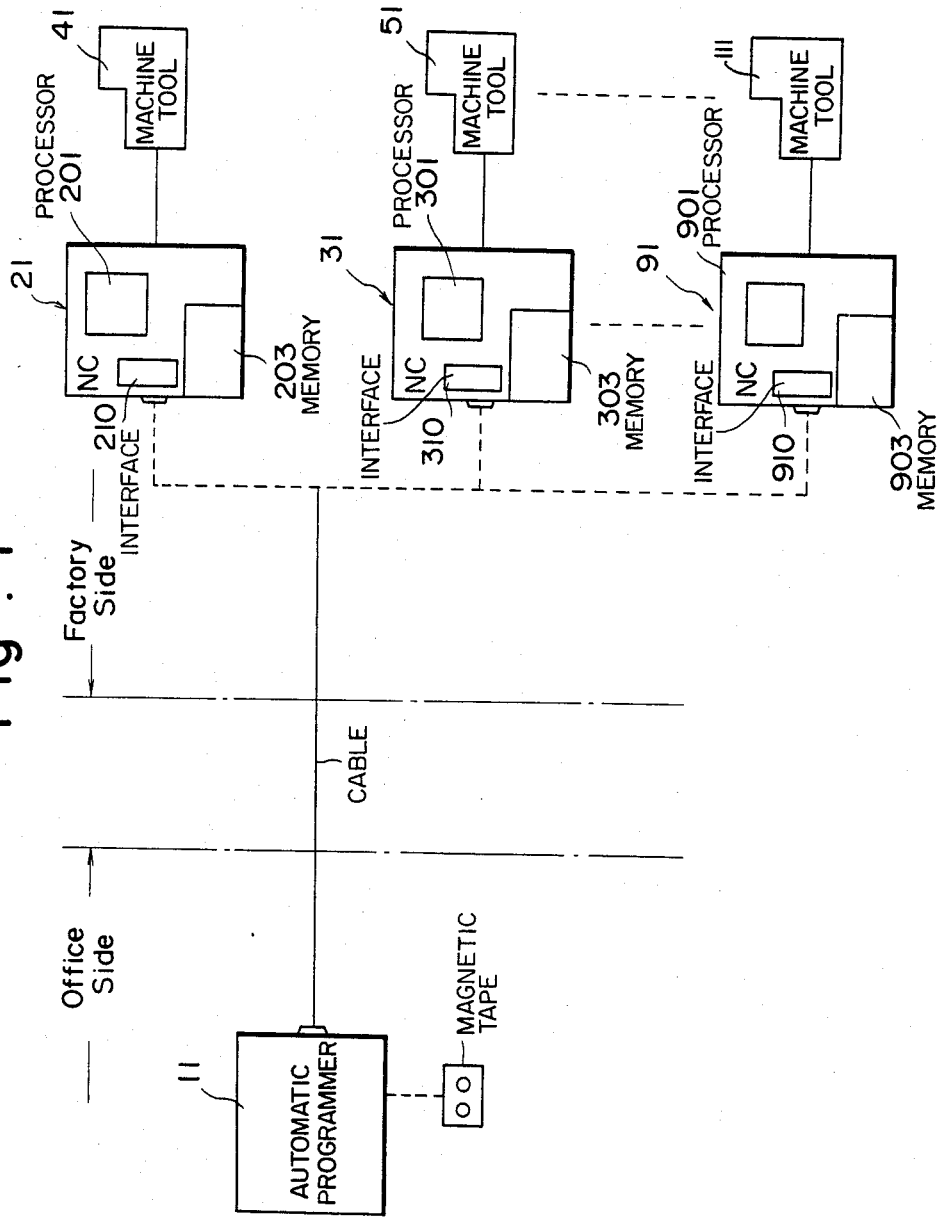
FIG. 1 is a block diagram of an embodiment of a numerical control system according to the present invention.

As shown in FIG. 1, the numerical control system of the present invention includes an automatic programmer 11 installed in an office, as well as numerical control (NC) devices 21, 31, . . . , 91 installed in a factory. The NC devices 21, 31, . . . , 91 include respective processing circuits 201, 301, . . . , 901 for executing NC processing, internal memories 203, 303, . . . , 903, such as bubble memories, for storing an NC program, interface circuits 210, 310, . . . , 910 for the exchange of NC program data with the automatic programmer 11, and other well-known circuitry. Each interface circuit is constructed in accordance with RS 232C standards. Numerals 41, 51, . . . , 111 denote the machine tools controlled by the NC devices 21, 31, . . . , 91, respectively. The automatic programmer 11 is selectively connected to a prescribed NC device by means of a coaxial or optical fiber cable CBL. The cable CBL has a plug connector (not shown) attached to each end thereof, through which the cable may be plugged into receptacles (not shown) attached to the automatic programmer and to each of the NC devices 21, 31, . . . , 91.

The automatic programmer 11 functions to prepare an NC program and to transfer the completed program data to the internal memory of the NC device to which the cable CBL is connected. The NC device which is to receive the program is selected by manually switching the connection between the automatic programmer 11 and the NC device.

Assume now that the automatic programmer 11 is connected to the NC device 21, that a mode selection switch on the operator's panel (not shown) of the NC device 21 is placed in the edit mode, and that the operator then depresses a read button. This will place the NC device 21 in the program reception mode, and will send a transfer request signal to the automatic programmer 11. The automatic programmer 11 responds to the request signal by transferring an NC program block-by-block to the internal memory 202 of the NC device 21 through the cable CBL. The NC program may be one which has been prepared in advance and stored in memory, or one which is prepared successively on the basis of data entered by a programming technician using blueprints. In the programming art a, so-called end-of-record (EOR) data is inserted immediately after the NC program. When the NC 21 senses this block in the data transferred from the automatic programmer 11, this is recognized by the NC device 21 as indicating that the NC program transmission is complete. The NC device 21 subsequently controls the machine tool 41 on the basis of the NC program stored in its internal memory 203.

It should be noted that the NC program prepared by the automatic programmer 11 can be prepared by loading it into a cassette-type magnetic tape MT. The NC program, once stored on the magnetic tape MT, can then be transferred to the internal memory of any of the NC devices through the cable CBL. Also, the issuance of the program request signal mentioned above is not an essential requirement of the system.

Figure 2:
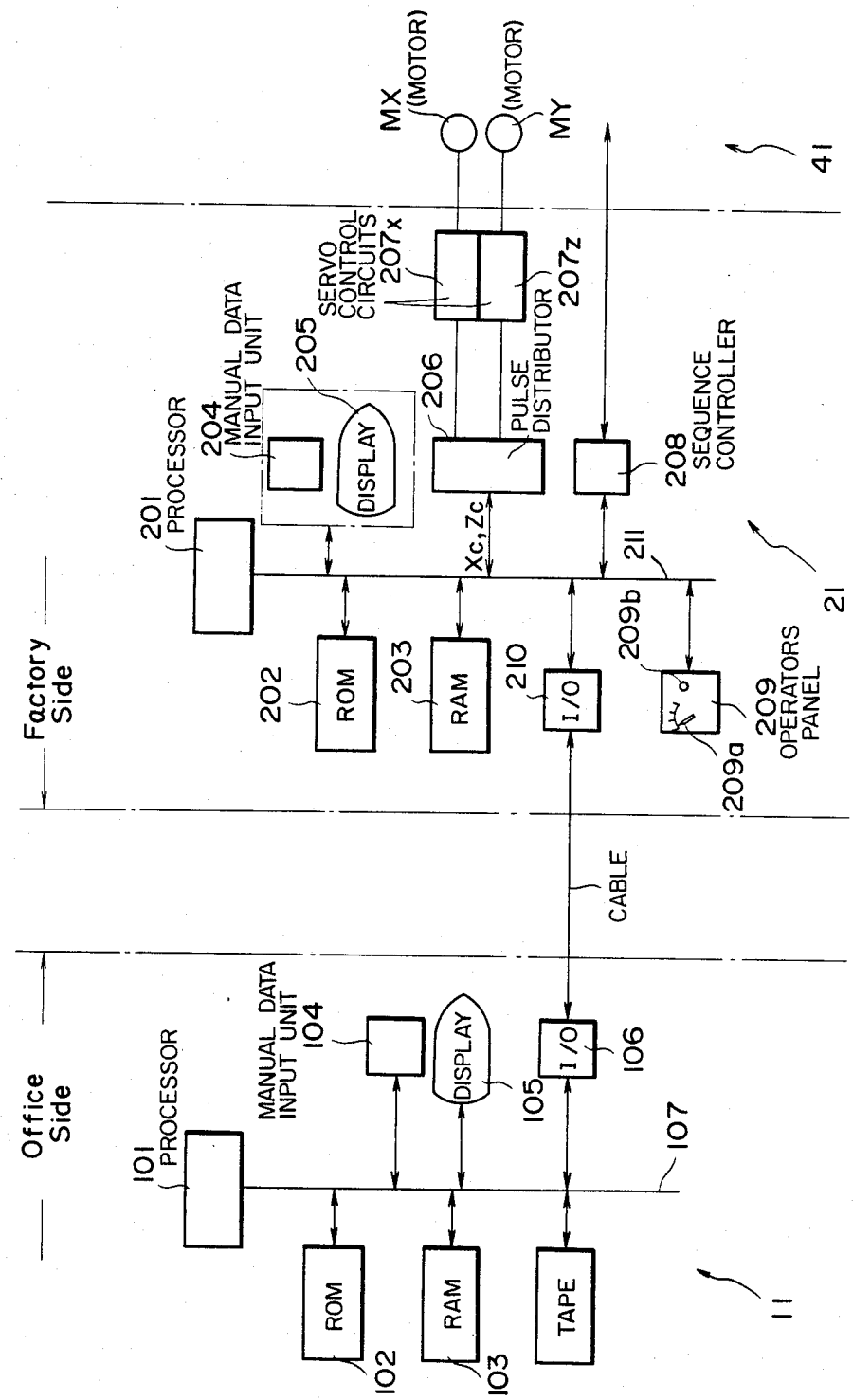
FIG. 2 is a more detailed view of the arrangement of FIG. 1.

The construction of the automatic programmer 11 and of the numerical control device 21, as well as the connection between them, is shown in greater detail in FIG. 2. Referring to FIG. 2, the automatic programmer 11 comprises a microprocessor 101 which executes processing for the preparation of a machining program (numerical control program) or the like, a read-only memory (ROM) 102 which stores a control program for the preparation of the machining program and for the editing of display data, a random access memory (RAM) 103 for storing the prepared machining program, a data input keyboard (or MDI) 104, a graphic display device 105 for displaying a contour pattern which is based on the data entered by the keyboard and for displaying the machining path specified by the prepared machining program, and input/output interface circuit 106 for administering the exchange of data with the NC device 21, and a cassette-type magnetic tape MT. The keyboard 104 is provided with a variety of keys (not shown). These include pattern input keys for entering, say, a desired contour pattern (namely patterns whose shapes have been determined but whose dimensions have not), so-called step number keys for entering the number of steps possessed by a step-like contour pattern, alpha-numeric keys for entering dimensions, present position and pattern modification information, a send key for sending the input data to the microprocessor 101, and a test key for displaying the machining path of a tool on the display device 105, based on the prepared machining program. The keyboard 104 additionally incorporates a buffer register (not shown) for storing the data entered by the keyboarding operations. This is the data transmitted to the microprocessor 101 by the send key. The graphic display device 105, shown in FIG. 3, includes a display control circuit DDC, a cathode ray tube CRT, a refresh memory RFM for storing one frame of display data delivered by the microprocessor 101, and a pattern generating circuit PGC for generating graphics and characters on the basis of the display data continuously read out of the refresh memory RFM via the display control circuit DCC. Returning to FIG. 2, numeral 107 denotes a bus for interconnecting the foregoing circuits, memories and the microprocessor to handle the exchange of data among them.

The numerical control device 21 comprises a microprocessor 201 for executing numerical control on the basis of the machining program and control program, a read-only memory (ROM) 202 for storing the control program, a bubble memory 203 for storing the machining program delivered by the automatic programmer 11, an MDI unit 204 for entering numerical control data block-by-block and for entering program revision data, a display device 205, a pulse distributor or interpolator 206 for executing a well-known arithmetic pulse distributing operation on the basis of input positioned commands $X_c$ and $Z_c$ and feed rate FOO, X- and Y-axis servo control circuits 207X and 207Z for driving and controlling motors $M_x$ and $Y_Y$ of the machine tool 41, a power sequence circuit or sequence controller 208 which, when M, S and T function commands are read from the machining program, is adapted to send these commands to the machine tool 41, and which delivers signals from the machine tool 41 to the microprocessor 201, these signals indicating the status of relay contacts and limit switches in the machine tool, an operator's panel 209, and an input/output interface circuit 210. Numeral 211 denotes a bus for interconnecting the foregoing circuits, memories, etc., in order to handle the exchange of data among them.

A description will now be had regarding the operation of the invention.

(A) The first item to be described will be the processing for automatic preparation of a machining program.

We will assume that the program is for a turning operation performed by a lathe.

First, assume that the contour patterns which can be entered by the keyboard 104 are as shown by (a) through (d) in FIG. 4. The keyboard 104 therefore will have four pattern input keys, each corresponding to one these four patterns. (An alternative arrangement would be to select the desired pattern by working the numeric keys mentioned above.) To enter the numerical data for the machining contour illustrated in FIG. 5, the first step is to depress the pattern input key corresponding to the illustrated pattern, then the step number key "3" to enter the three steps, and finally the send key. This feeds the contour pattern information and step number information into the microprocessor 101. Upon receiving this information, the microprocessor 101 executes processing for editing display data in accordance with an editing program. The flowchart for such processing is illustrated in FIG. 6.

Figure 5:
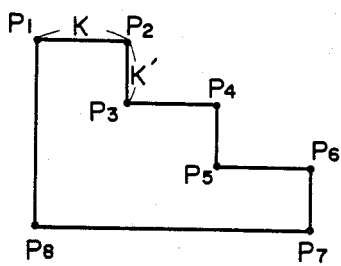
Figure 6:
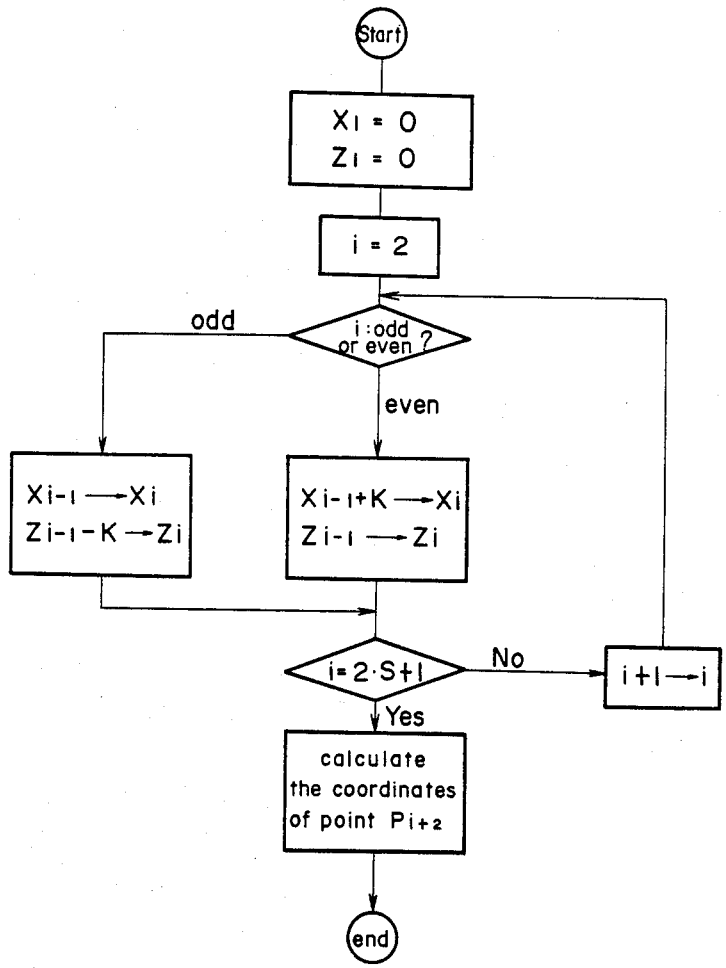
FIG. 6 is a flowchart of processing for editing display data in FIG. 2.

Specifically, let $P_1, P_2, \ldots$ designate each corner point of the contour pattern shown in FIG. 5. Then, in accordance with the editing process, the coordinate values of the points $P_i (i=1, 2, \ldots)$ are set, the display data is edited on the basis of these coordinate values, and the edited display data is fed to the graphic display device 105. A more detailed discussion of this processing will now follow.

First, the starting point (point $P_1$) is taken as the zero point, or origin. That is, the X-coordinate and Z-coordinate are both zero (i.e., $X_1=Z_1=0$). Next, the coordinates $(X_i, Z_i)$ of the points $P_i (i=2, 3, \ldots)$ are found. To obtain the coordinates of point $P_2$, for example, the following operations are performed, namely:

$(X_1+K) \rightarrow X_2, Z_1 \rightarrow Z_2$ whereby the coordinates $(X_2, Z_2)$ are found. Thereafter a decision step determines whether i is equal to $(2S+1)$ (where S is the number of steps on the contour; in the example of FIG. 5, S=3). If the result of the decision is non-equality, then the operation $i+1 \rightarrow i$ is performed, and the coordinates $(X_3, Z_3)$ of point $P_3$ are found by performing the operation:

$X_2 \rightarrow X_3, (Z_1-K') \rightarrow Z_3$

These arithmetic operations are repeated in similar fashion until $i=2S+1$ (namely i=7) is satisfied. When this occurs, the coordinates $(X_8, Z_8)$ of point $P_8$ are found from:

$X_1 \rightarrow X_8, S \cdot K' \rightarrow Z_8$

This ends the processing for setting the coordinate values of all points $P_i$. In the above, K, K' are numerical values which are entered by operating the keyboard 104.

Figure 7:
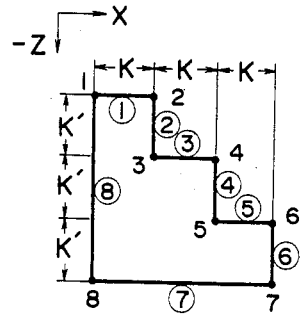
FIG. 7 is a contour pattern displayed on a display device by the editing processing of FIG. 6.

The processor 101 utilizes these coordinate values to edit the display data. The display data is composed of the following for this particular case (refer also to FIG. 7, which shows the contour pattern that will be displayed on the CRT as a result of the processing now being described):

| | |
|---|---|
| "Point 0,0 blank" | Data for positioning the CRT beam at the zero point; |
| "Vector K,0 solid line" | Data for displaying line segment (1); |
| "Vector 0,K' solid line" | Data for displaying line segment (2); |
| "Vector k,0 solid line" | Data for displaying line segment (3); |
| "Vector 0,3K' solid line" | Data for displaying line segment (8) |

After this editing operation, the display data is sent to the graphic display device 105, where the data is stored in the refresh memory RFM through the display control circuit DCC, shown in FIG. 3. The display control circuit DCC continuously and repeatedly reads this data out of the refresh memory RFM and applies it to the pattern generator PGC. The latter generates the pattern specified by the display data and causes it to be displayed on the CRT. The result is the contour pattern of FIG. 7. Note that the encircled numbers correspond to the numbers that identify the segments in the above-described display data.

When the desired contour pattern appears on the screen of the CRT, the operator then enters the actual dimensions of the contour or the actual positional coordinates of each point $P_i$ while he views both the displayed shape and his work drawing. It should be noted that each corner of the contour pattern displayed on the CRT is accompanied by a displayed identifying number "1", "2", ..., "7" (or by a letter of the alphabet).

Figures 8, 9:
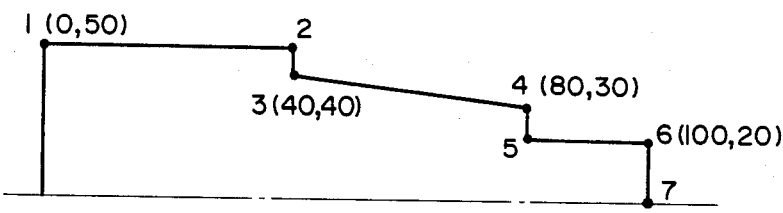
FIG. 8 is useful in describing the data stored in a memory as a result of the editing processing of FIG. 6.
FIG. 9 is a final contour pattern displayed on a display device as a result of the editing processing of FIG. 6.

When the above processing for editing the display data is completed, the provisional coordinates (that is, not the actual coordinates, which have yet to be entered by the operator) specifying each of the contour corners are stored in the RAM 103, in the form shown in (a) of FIG. 8. If the alpha-numeric keys on keyboard 104 are operated under these conditions to enter:

1    $X_1, Z_1$ then the coordinates of each corner will be recomputed, and the data stored in RAM 103 will be converted to the form shown in (b) of FIG. 8. If the operator repeats this operation to enter the coordinates of prescribed corners, then the coordinates of all the corners can be found, and the data in RAM 103 will have the final form shown in (c) of FIG. 8. For example, if the operator enters the positional coordinates:

| | | |
|---|---|---|
| 1 | 0, | 50 |
| 3 | 40, | 40 |
| 4 | 80, | 30 |
| 6 | 100, | 20 | to specify the corners, 1, 3, 4 and 6, the shape of the final contour will be as illustrated in FIG. 9. It is noteworthy that the final contour can be set even without entering the coordinates of corners 2 and 5. In other words, minimal numerical data relating to coordinates or dimensions need be entered to specify the final contour. Moreover, the input sequence can be a random one if so desired.

The microprocessor 101 edits the display data in the above manner each time one item of numerical data is entered, and causes the data to be delivered to the graphic display device 105 for display on the screen of the CRT. Thus, the contour which appears on the CRT successively changes in shape on the basis of each item of numerical data which arrives. The arrangement is such that the contour displayed on the CRT will not extend beyond the edges of the screen without, at the same time, appearing too small for easy viewing.

Since the contour displayed on the basis of the numerical data changes in shape immediately after each item of the numerical data is entered, the operator can determine visually whether each data item is correct. As the entering of the numerical data proceeds, the displayed contour is gradually modified into the desired final contour depicted on the work drawing or blueprint, enabling the operator to visually confirm the transistion to the final contour. This provides a method of creating a numerical control program with little possibility of error.

Thus, the numerical data relating to positional coordinates or dimensions for specifying the final contour is entered in the manner described above. The next step is to enter the data relating to tool movement, such as starting point and end point positions, the distance and direction of relief in the X direction, namely $\pm \Delta u$, the distance and direction of relief in the Z direction namely $\pm \Delta w$, the feed rate FOO, spindle rpm S00, depth of cut $\Delta d$, and so forth. The entry of these items of data completes the input operation for all numerical control data required to perform turning work by means of a lathe.

Figure 10:
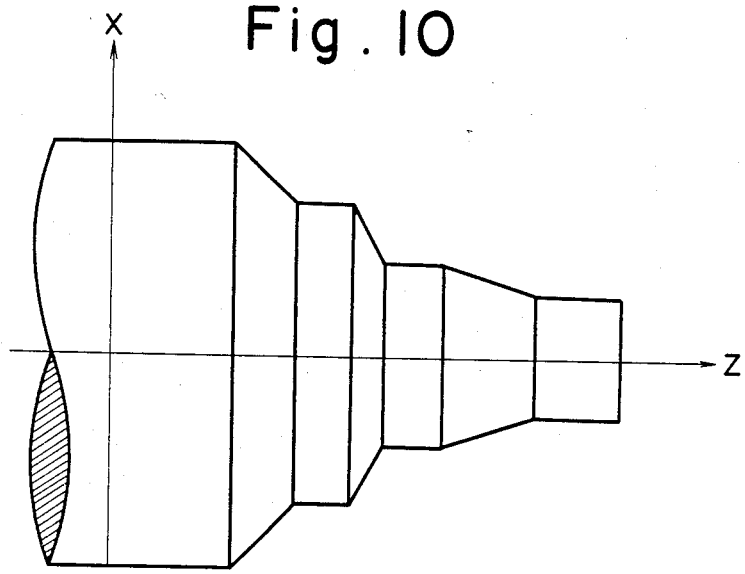
FIGS. 10 and 11 are useful in describing the preparation of a machining program.

After the completion of the input operation, the microprocessor 101 utilizes the numerical control data to automatically create the machining program under the direction of the control program for the preparation of machining programs. For example, referring to the final contour shown in FIG. 10, let $\Delta u = 4.0$, $\Delta w = 2.0$, $\Delta d = 7.0$ mm, and assume that the feed speed and spindle rpm for a stock removal cycle (i.e., rough cutting down to outer diameter) are F30 and S55, respectively, and that the feed speed and spindle rpm for a finishing cycle are F15 and S58, respectively. Under such conditions, the microprocessor 101 will produce the following standard type program using a conventional programming language such as APT:

| NO 10 | G50 | X200.0 Z220.0; |
| NO 11 | G00 | X160.0 Z118.0; |
| NO 12 | G71 | P013 Q019 U4.0 W2.0 D7000 F30 S55; |
| NO 13 | G00 | X80.0 F15 R58; |
| NO 14 | G01 | W-40.0; |
| NO 15 | | X120.0 W-30.0 |
| NO 16 | | W-20.0; |
| NO 17 | | X200.0 W-10.0; |
| NO 18 | | W-20.0; |
| NO 19 | | X280.0 W-20.0; |
| NO 20 | G70 | P013 Q019; |

Figure 11:
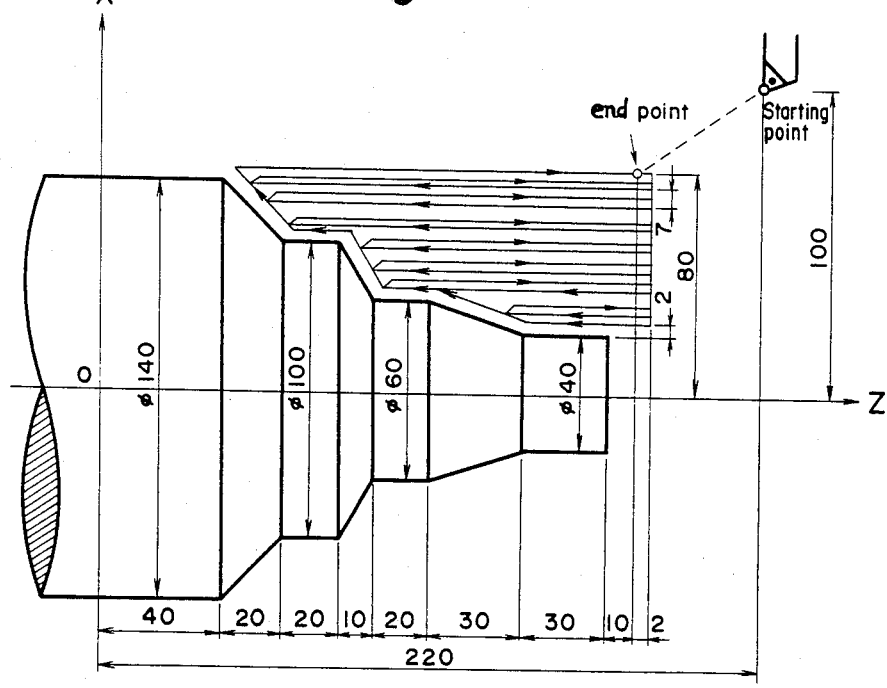

It should be noted that the above program specifies the diameter of the workpiece. In the program, moreover, Ni (i=010 to 020) denotes the sequence number, G50 a G-function command for establishing the coordinate system, G00, G01, G71 and G70 M-function commands for positioning, linear interpolation, stock removal cycle and finishing cycle, respectively, X and Z absolute commands, and U and W incremental commands. Further, block NO 10 signifies the coordinate values of the tool starting point, and block NO 11 the coordinate values of the end point thereof. Block NO 12 indicates a command for rough cutting, down to a depth of 7.0, and the shape is specified by the blocks at sequence number NO 13 through NO 19. Blocks NO 13 through NO 19 indicate the final shape of the machined workpiece where X equals an absolute position and W an incremental position with respect to the Z axis. Block NO 20 indicates a command for finishing machining for the shape specified by blocks NO 13 through NO 19. See FIG. 11 for these details presented graphically;

When the above-described machining program has been prepared, the machining program is stored in memory 103 to end the processing for machining program preparation. If the operator now depresses the test key on the keyboard, the machining program data will be read out of the memory successively, causing the machining path followed by the tool, as illustrated in FIG. 11, to be displayed on the CRT of the graphic display device 105.

(B) Described next will be the processing for transferring the machining program.

When the machining program has been prepared by the sequence described in (A) above, the automatic programmer 11 responds to a transfer request by transferring the machining program to the NC device 21. Specifically, when the operator on the side of the NC device 21 sets the mode selection switch 209a on the operator's panel 209 to edit mode and then depresses the read button 209b, a transfer request signal is transmitted to the automatic programmer 11 through the input/output interface circuit 210, cable CBL, and input/output interface circuit 106, in the order mentioned. The microprocessor 101 in automatic programmer 11 responds to the transfer request by starting the machining program transfer processing. More specifically, the microprocessor 101 causes the machining program data in memory 103 to be successively fed into a buffer register (not shown) within the interface 106. As a result, an input/output control unit (not shown), also located within the interface 106, transfers the machining program data, serially or in parallel, to a buffer register (not shown) in the input/output interface circuit 210, through the cable CBL. The microprocessor 201 in NC device 21, on the other hand, stores the machining program data, which is transferred to the interface 210, in the memory 203 and senses whether the end of record (EDR) data is present. The microprocessors 101 and 201 continue to cooperate in successively storing the machining program data in memory 203, through the memory 103, interface 106, cable CBL and interface 210, just as described above, until microprocessor 201 senses the EDR data. This completes the processing for the transfer of the machining program to the memory 203 of NC device 21.

(C) Next, processing for the control of the machine tool will be discussed.

When the machining program has been stored in memory 203, the NC device 21 is placed in a state enabling ordinary numerical control processing (namely control of a machine tool). If the operator now places the mode selection switch 209a on the operator's panel 209 in the so-called "memory run" mode and then depresses the cycle start button, the microprocessor 201 will read the machining program data out of the memory 203 successively and cause execution of the stock removal and finishing cycle machining operations under the direction of the control program.

When it is desired that the other NC devices 31, . . . , 91 (FIG. 1) having the machine tools 51, . . . , execute another NC machining operation, the automatic programmer 11 need only be connected to these other NC devices by the cable CBL, followed by repeating the foregoing procedure. A plurality of machining programs, with appended identification codes, may be stored in the memory 103 of automatic programmer 11 in advance, and the prescribed program may be selected when desired and transferred to the NC device. Various methods can be adopted to designate the prescribed program. For example, designation can take place along with the transfer request from the NC device side. Alternatively, an individual on the factory side can place a telephone call to the programming technician on the office side and inform him of the desired machining program. The technician may then respond by keyboarding the automatic programmer 11 to designate the prescribed program. Another arrangement would be to preserve the prepared machining programs in an external storage medium, such as the cassette-type magnetic tape MT, and then select the desired machining program from the storage medium for transmission to the NC device.

Figure 12:
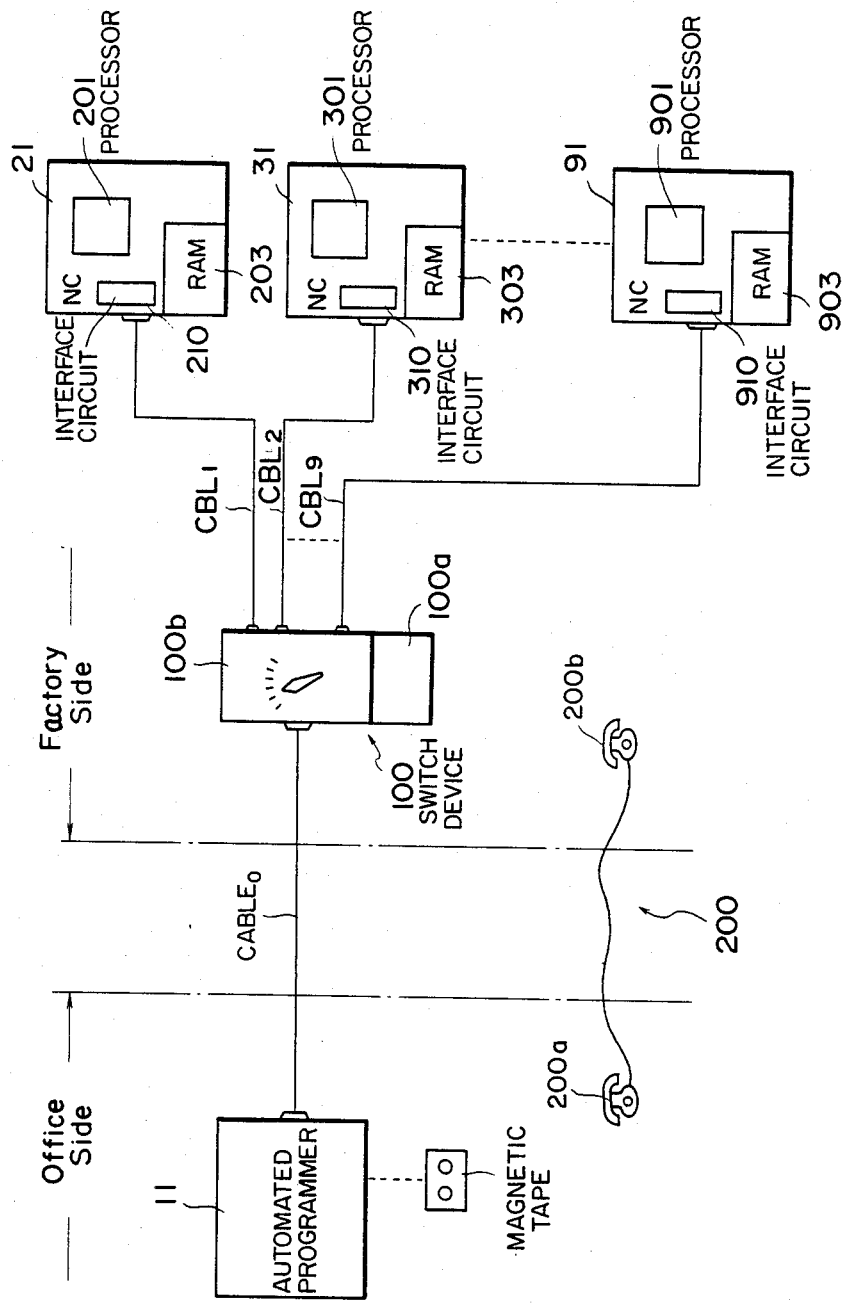

Another embodiment of the numerical control system according to the present invention is illustrated in the block diagram of FIG. 12. Here a switching device 100, conforming to RS 232C standards and having a switching circuit 100a and a switch box 100b, is provided on the factory side for the purpose of selectively connecting the automatic programmer 11 to a desired NC device. Also provided is a telephone system 200 having telephones 200a and 200b on the office and factory sides, respectively. Unlike the previous embodiment, the provision of the switching device 100 in the present arrangement make it possible to connect the automatic programmer 11 to the desired NC device merely by manipulating the switch box 100b. Once the connection has been made, the operation proceeds exactly as described above. With this arrangement, an individual on the factory side can have someone on the office side transfer the desired machining program merely by placing a call to the office side. This is convenient when the factory and office are remote from each other.

A further embodiment of the present invention is illustrated in the block diagram of FIG. 13. In this case, the switching device 100, having the switching circuit 100a and switch box 100b, is provided on the office side for the purpose of selectively connecting the automatic programmer 11 to a desired NC device. Numerals 208, 308, . . . , 908 denote sequence power circuits or sequence controllers incorporated in respective ones of the NC devices 21, 31, . . . , 91. These are computerized units which administer the exchange of control signals between the automatic programmer 11 and the machine tools, or which execute prescribed sequence control. A multiple cable MCBL is provided for the connection between the switching device 100 and the NC devices.

Assume that a machining program has been prepared and stored in the memory of the automatic programmer 11. If the operator on the office side now manipulates the switching device 100 to connect the automatic programmer 11 with the desired NC device 21, the machining program is transferred to the NC device 21 through the following processing.

When the NC device 21 is selected by the switching device 100, the latter sends a selection signal to the sequence controller 208 of NC device 21 through line $l_{11}$. The sequence controller 208 responds to the selection signal by executing sequence processing, placing the NC device 21 in the edit mode and generating a start signal. In other words, as far as the NC device 21 is concerned, it is just as if the edit mode has been selected by operating the mode selection switch, and as if the read button had been depressed. Accordingly, the sequence controller 208 places the NC device 21 in a mode enabling it to receive the machining program, and sends a program request command to the automatic programmer 11 through line $l_{12}$. The automatic programmer 11 responds to the command by transferring the machining program to the NC device 21 on line $l_{12}$. Thenceforth the machining data is successively transmitted to the NC device 21 until the NC device senses the end of record data EOR, signifying that the entire machining program has been received. When this occurs, the NC device notifies the sequence controller 208 of the fact, the controller 208 responds by sending a reception completion command, namely an "answer back" signal, to the automatic programmer 11 through line $l_{12}$. Thereafter, the sequence controller 208 executes sequence processing in response to the start signal, placing the NC device 21 in the memory run mode and causing a cycle start signal to be generated. As far as the NC device 21 is concerned, therefore, it is just as if the memory run mode had been selected by the mode selection switch, and as if the cycle start button had been depressed. This causes the machining program to be read out of the bubble memory (internal memory) 203 sequentially so that the NC device may subject the machine tool to the prescribed numerical control.

In accordance with the present invention as described and illustrated hereinabove, a machining program can be prepared automatically in a short period of time, and both the preparation of the program and the numerical control of a machine tool can be executed concurrently. This provides a numerical control system of an extremely high efficiency. Moreover, each of the NC devices at the factory need not be provided with an automatic programming function, and it is possible to dispense with paper tape readers and punchers. The result is a reduction in total cost. Since the present invention enables the automatic programmer 11 to be installed in a quiet office remote from the factory, programs can be created in an environment conducive to concentration. Also, the invention enables completed programs to be preserved on a cassette-type magnetic tape or similar medium, so that the desired program can be selected from the memory medium and transferred to the prescribed numerical control device.

As many apparently widely different embodiments of the present invention can be made without departing from the spirit and scope thereof, it is to be understood that the invention is not limited to the specific embodiments thereof except as defined in the appended claims.

What we claim is:

1. A numerical control system for a machine tool, comprising:
   a cable;
   an automatic programmer; and
   a numerical control device connected to the machine tool and to said automatic programmer through said cable;
   said automatic programmer comprising:
   an input unit for entering data required for the preparation of a numerical control program;
   a first processor, operatively connected to said input unit, which edits the data entered by said input unit for preparing the numerical control program and which produces an output;
   display means, operatively connected to said first processor, for displaying graphics in accordance with the output from said first processor;
   first memory means, operatively connected to said first processor, for storing the prepared numerical control program; and
   a first interface circuit, operatively connected to said first processor, for administering the exchange of the data with said numerical control device; and said first processor of said automatic programmer displays, on said display means, a graphic which conforms to a contour pattern entered through said input unit, numerical data entered by said input unit being used to edit the displayed graphic, to display on said display means a graphic modified in shape on the basis of said entered numerical data, and prepares the numerical control program on the basis of said entered contour pattern and numerical data;

said numerical control device comprising:

a second interface circuit operatively connected to said first interface circuit of said automatic programmer through said cable;

second memory means, operatively connected to said second interface circuit, for storing the numerical control program transferred from said first memory means of the automatic programmer through said first and second interface circuits and said cable; and a second processor, operatively connected to said second memory means and the machine tool, which executes numerical control processing in accordance with the numerical control program stored in said second memory means for numerically controlling the machine tool connected to said numerical control device.

2. A numerical control system as recited in claim 1, further comprising plural numerical control devices and cables connected thereto, and switching means, operatively connected between said automatic programmer and said numerical control devices via said cables, for selectively connecting said automatic programmer to one of said numerical control devices and for placing the selected numerical control device in an edit mode for receiving the numerical control program data.

3. A numerical control system for a machine tool and responsive to operator inputs, comprising:

numerical control means, operatively connected to the machine tool, for controlling the machine tool in dependence upon a machining program, said automatic programmer including means for displaying the selected dimensionless part contour, for allowing entry of the dimensional information and for changing the shape of the part contour displayed as the dimensional information is entered and in correspondence thereto and automatic programmer means, operatively connected to said numerical control means, for producing the machining program from a selected dimensionless part contour and operator entered dimensional information for a machined part, where the dimensionless part contour is complete as to the general shape of the machined part, said automatic programmer including means for displaying the selected dimensionless part contour, for allowing entry of the dimensional information and for changing the shape of the part contour displayed as the dimensional information is entered and in correspondence thereto.

4. A numerical control system according to claim 3, wherein the entered dimensional information is selected from corner coordinates and surface lengths.

5. A numerical control system according to claim 3, wherein said automatic programmer includes means for entering tool movement information and producing the machining program from the selected dimensionless contour, the entered dimensional information and the entered tool movement information.

6. A method of entering part machining information in an automatic programmer for a machine tool, comprising the steps of:

(a) identifying a selected dimensionless part contour from contour selection information;

(b) displaying the selected dimensionless part contour;

(c) requesting input of dimension information for the dimensionless part contour for each unknown dimension and accepting entry of the dimension information; and (d) displaying a modified part contour after each entry of the dimension information for each unknown dimension where the modification conforms to the entered dimensions.

7. A method according to claim 6, further comprising the step of (e) entering tool movement information.

8. A method according to claim 7, wherein the automatic programmer is responsive to operator inputs and step (c) comprises the step of displaying the part contour with identifiers indicating which portions of the contour require entry of dimension information.

9. A method according to claim 6, wherein the automatic programmer is responsive to operator inputs and step (a) comprises the steps of:

(i) displaying available dimensionless part contours; and (ii) selecting the desired dimensionless part contour in dependance upon an operator input of the contour selection information.

* * * * *

UNITED STATES PATENT AND TRADEMARK OFFICE
CERTIFICATE OF CORRECTION

PATENT NO. : 4,519,026

DATED : May 21, 1985

INVENTOR(S) : RYOICHIRO NOZAWA ET AL.

It is certified that error appears in the above-identified patent and that said Letters Patent is hereby corrected as shown below:

Title page:

75, after "Nozawa" insert --of Tokyo--; after "Kiya" insert --of Tokyo, both of Japan--.

Col. 1, line 49, after "microprocessor" insert --)--.

Col. 2, line 51, "," should be --;--.

Col. 3, line 46, "art a," should be --art, a--;

line 66, start new paragraph with "Referring".

Col. 4, line 50, "positioned" should be --positional--.

Col. 5, line 6, after "one" insert --of--;

line 36, "i" should be --$\underline{i}$--.

Col. 6, line 36, "then" should be on line 37 as new line.

Col. 9, line 25, "make" should be --makes--.

UNITED STATES PATENT AND TRADEMARK OFFICE
CERTIFICATE OF CORRECTION

PATENT NO. : 4,519,026  Page 2 of 2

DATED : May 21, 1985

INVENTOR(S) : RYOICHIRO NOZAWA ET AL.

It is certified that error appears in the above-identified patent and that said Letters Patent is hereby corrected as shown below:

Col. 11, line 43, delete ", said";

delete lines 44-48 in their entirety;

line 45, delete "and in correspondence thereto";

line 49, before "and" insert --;--;

Col. 12, line 49, "dependance" should be --dependence--.

Signed and Sealed this

Thirty-first Day of December 1985

[SEAL]

Attest:

DONALD J. QUIGG

Attesting Officer   Commissioner of Patents and Trademarks